US008554564B2

(12) United States Patent
Hetherington et al.

(10) Patent No.: US 8,554,564 B2
(45) Date of Patent: Oct. 8, 2013

(54) SPEECH END-POINTER

(75) Inventors: Phil Hetherington, Port Moody (CA); Alex Escott, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

(21) Appl. No.: 13/455,886

(22) Filed: Apr. 25, 2012

(65) Prior Publication Data

US 2012/0265530 A1 Oct. 18, 2012

Related U.S. Application Data

(63) Continuation of application No. 11/152,922, filed on Jun. 15, 2005, now Pat. No. 8,170,875.

(51) Int. Cl.

*G10L 15/04* (2013.01)
*G10L 15/00* (2013.01)
*G10L 25/93* (2013.01)

(52) U.S. Cl.

USPC ............ 704/253; 704/233; 704/210; 704/215

(58) Field of Classification Search

None

See application file for complete search history.

(56) References Cited

U.S. PATENT DOCUMENTS

| | | | |
|---|---|---|---|
| 55,201 | A | 5/1866 | Cushing |
| 4,435,617 | A | 3/1984 | Griggs et al. |
| 4,486,900 | A | 12/1984 | Cox et al. |
| 4,531,228 | A | 7/1985 | Noso et al. |
| 4,532,648 | A | 7/1985 | Noso et al. |
| 4,630,305 | A | 12/1986 | Borth et al. |
| 4,701,955 | A | 10/1987 | Taguchi |
| 4,811,404 | A | 3/1989 | Vilmur et al. |
| 4,843,562 | A | 6/1989 | Kenyon et al. |
| 4,856,067 | A | 8/1989 | Yamada et al. |
| 4,945,566 | A | 7/1990 | Mergel et al. |
| 4,989,248 | A | 1/1991 | Schalk et al. |
| 5,027,410 | A | 6/1991 | Williamson et al. |
| 5,056,150 | A | 10/1991 | Yu et al. |
| 5,146,539 | A | 9/1992 | Doddington et al. |
| 5,151,940 | A | 9/1992 | Okazaki et al. |

(Continued)

FOREIGN PATENT DOCUMENTS

| | | |
|---|---|---|
| CA | 2158847 | 9/1994 |
| CA | 2157496 | 10/1994 |

(Continued)

OTHER PUBLICATIONS

Avendano, C., Hermansky, H., "Study on the Dereverberation of Speech Based on Temporal Envelope Filtering," Proc. ICSLP '96, pp. 889-892, Oct. 1996.

(Continued)

*Primary Examiner* — Jesse Pullias

(74) *Attorney, Agent, or Firm* — Brinks Hofer Gilson & Lione

(57) ABSTRACT

A rule-based end-pointer isolates spoken utterances contained within an audio stream from background noise and non-speech transients. The rule-based end-pointer includes a plurality of rules to determine the beginning and/or end of a spoken utterance based on various speech characteristics. The rules may analyze an audio stream or a portion of an audio stream based upon an event, a combination of events, the duration of an event, or a duration relative to an event. The rules may be manually or dynamically customized depending upon factors that may include characteristics of the audio stream itself, an expected response contained within the audio stream, or environmental conditions.

20 Claims, 10 Drawing Sheets

(56) References Cited

U.S. PATENT DOCUMENTS

| | | | |
|---|---|---|---|
| 5,152,007 | A | 9/1992 | Uribe |
| 5,201,028 | A | 4/1993 | Theis |
| 5,293,452 | A | 3/1994 | Picone et al. |
| 5,305,422 | A | 4/1994 | Junqua |
| 5,313,555 | A | 5/1994 | Kamiya |
| 5,400,409 | A | 3/1995 | Linhard |
| 5,408,583 | A | 4/1995 | Watanabe et al. |
| 5,479,517 | A | 12/1995 | Linhard |
| 5,495,415 | A | 2/1996 | Ribbens et al. |
| 5,502,688 | A | 3/1996 | Recchione et al. |
| 5,526,466 | A | 6/1996 | Takizawa |
| 5,568,559 | A | 10/1996 | Makino |
| 5,572,623 | A | 11/1996 | Pastor |
| 5,584,295 | A | 12/1996 | Muller et al. |
| 5,596,680 | A | 1/1997 | Chow et al. |
| 5,617,508 | A | 4/1997 | Reaves |
| 5,677,987 | A | 10/1997 | Seki et al. |
| 5,680,508 | A | 10/1997 | Liu |
| 5,687,288 | A | 11/1997 | Dobler et al. |
| 5,692,104 | A | 11/1997 | Chow et al. |
| 5,701,344 | A | 12/1997 | Wakui |
| 5,732,392 | A | 3/1998 | Mizuno et al. |
| 5,794,195 | A | 8/1998 | Hormann et al. |
| 5,933,801 | A | 8/1999 | Fink et al. |
| 5,949,888 | A | 9/1999 | Gupta et al. |
| 5,963,901 | A | 10/1999 | Vahatalo et al. |
| 6,011,853 | A | 1/2000 | Koski et al. |
| 6,021,387 | A | 2/2000 | Mozer et al. |
| 6,029,130 | A | 2/2000 | Ariyoshi |
| 6,098,040 | A | 8/2000 | Petroni et al. |
| 6,163,608 | A | 12/2000 | Romesburg et al. |
| 6,167,375 | A | 12/2000 | Miseki et al. |
| 6,173,074 | B1 | 1/2001 | Russo |
| 6,175,602 | B1 | 1/2001 | Gustafsson et al. |
| 6,192,134 | B1 | 2/2001 | White et al. |
| 6,199,035 | B1 | 3/2001 | Lakaniemi et al. |
| 6,216,103 | B1 | 4/2001 | Wu et al. |
| 6,240,381 | B1 | 5/2001 | Newson |
| 6,304,844 | B1 | 10/2001 | Pan et al. |
| 6,317,711 | B1 | 11/2001 | Muroi |
| 6,324,509 | B1 | 11/2001 | Bi et al. |
| 6,356,868 | B1 | 3/2002 | Yuschik et al. |
| 6,405,168 | B1 | 6/2002 | Bayya et al. |
| 6,434,246 | B1 | 8/2002 | Kates et al. |
| 6,453,285 | B1 | 9/2002 | Anderson et al. |
| 6,453,291 | B1 | 9/2002 | Ashley |
| 6,487,532 | B1 | 11/2002 | Schoofs et al. |
| 6,507,814 | B1 | 1/2003 | Gao |
| 6,535,851 | B1 | 3/2003 | Fanty et al. |
| 6,574,592 | B1 | 6/2003 | Nankawa et al. |
| 6,574,601 | B1 | 6/2003 | Brown et al. |
| 6,587,816 | B1 | 7/2003 | Chazan et al. |
| 6,643,619 | B1 | 11/2003 | Linhard et al. |
| 6,687,669 | B1 | 2/2004 | Schrögmeier et al. |
| 6,711,540 | B1 | 3/2004 | Bartkowiak |
| 6,721,706 | B1 | 4/2004 | Strubbe et al. |
| 6,782,363 | B2 | 8/2004 | Lee et al. |
| 6,822,507 | B2 | 11/2004 | Buchele |
| 6,850,882 | B1 | 2/2005 | Rothenberg |
| 6,859,420 | B1 | 2/2005 | Coney et al. |
| 6,873,953 | B1 | 3/2005 | Lennig |
| 6,910,011 | B1 | 6/2005 | Zakarauskas |
| 6,996,252 | B2 | 2/2006 | Reed et al. |
| 7,117,149 | B1 | 10/2006 | Zakarauskas |
| 7,146,319 | B2 | 12/2006 | Hunt |
| 7,535,859 | B2 | 5/2009 | Brox |
| 2001/0028713 | A1 | 10/2001 | Walker |
| 2002/0071573 | A1 | 6/2002 | Finn |
| 2002/0176589 | A1 | 11/2002 | Buck et al. |
| 2003/0040908 | A1 | 2/2003 | Yang et al. |
| 2003/0120487 | A1 | 6/2003 | Wang |
| 2003/0216907 | A1 | 11/2003 | Thomas |
| 2004/0078200 | A1 | 4/2004 | Alves |
| 2004/0138882 | A1 | 7/2004 | Miyazawa |
| 2004/0165736 | A1 | 8/2004 | Hetherington et al. |
| 2004/0167777 | A1 | 8/2004 | Hetherington et al. |
| 2005/0096900 | A1 | 5/2005 | Bossemeyer et al. |
| 2005/0114128 | A1 | 5/2005 | Hetherington et al. |
| 2005/0240401 | A1 | 10/2005 | Ebenezer |
| 2006/0034447 | A1 | 2/2006 | Alves et al. |
| 2006/0053003 | A1 | 3/2006 | Suzuki et al. |
| 2006/0074646 | A1 | 4/2006 | Alves et al. |
| 2006/0080096 | A1 | 4/2006 | Thomas et al. |
| 2006/0100868 | A1 | 5/2006 | Hetherington et al. |
| 2006/0115095 | A1 | 6/2006 | Glesbrecht et al. |
| 2006/0116873 | A1 | 6/2006 | Hetherington et al. |
| 2006/0136199 | A1 | 6/2006 | Nongpiur et al. |
| 2006/0161430 | A1 | 7/2006 | Schweng |
| 2006/0178881 | A1 | 8/2006 | Oh et al. |
| 2006/0251268 | A1 | 11/2006 | Hetherington et al. |
| 2007/0033031 | A1 | 2/2007 | Zakarauskas |
| 2007/0219797 | A1 | 9/2007 | Liu et al. |
| 2007/0288238 | A1 | 12/2007 | Hetherington et al. |

FOREIGN PATENT DOCUMENTS

| | | | |
|---|---|---|---|
| CA | 2158064 | | 10/1994 |
| CN | 1042790 | A | 6/1990 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 0 543 329 | B1 | 2/2002 |
| EP | 1 450 353 | A1 | 8/2004 |
| EP | 1 450 354 | A1 | 8/2004 |
| EP | 1 669 983 | A1 | 6/2006 |
| JP | 06269084 | A2 | 9/1994 |
| JP | 06319193 | A | 11/1994 |
| JP | 2000-250565 | | 9/2000 |
| KR | 10-1999-0077910 | A | 10/1999 |
| KR | 10-2001-0091093 | A | 10/2001 |
| WO | WO 00-41169 | A1 | 7/2000 |
| WO | WO 0156255 | A1 | 8/2001 |
| WO | WO 01-73761 | A1 | 10/2001 |
| WO | WO 2004/111996 | | 12/2004 |

OTHER PUBLICATIONS

Berk et al., "Data Analysis with Microsoft Excel", Duxbury Press, 1998, pp. 236-239 and 256-259.

Fiori, S., Uncini, A., and Piazza, F., "Blind Deconvolution by Modified Bussgang Algorithm", Dept. of Electronics and Automatics—University of Ancona (Italy), ISCAS 1999.

Learned, R.E. et al., A Wavelet Packet Approach to Transiet Signal Classification, Applied and Computational Harmonic Analysis, Jul. 1995, pp. 265-278, vol. 2, No. 4, USA, XP 000972660. ISSN: 1063-5203. abstract.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.

(56) References Cited

OTHER PUBLICATIONS

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.
Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.
Vieira, J., "Automatic Estimation of Reverberation Time", Audio Engineering Society, Convention Paper 6107, 116th Convention, May 8-11, 2004, Berlin, Germany, pp. 1-7.
Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.
Canadian Examination Report of related application No. 2,575, 632, Issued May 28, 2010.
Savoji, M. H. "A Robust Algorithm for Accurate Endpointing of Speech Signals" Speech Communication, Elsevier Science Publishers, Amsterdam, NL, vol. 8, No. 1, Mar. 1, 1989 (pp. 45-60).
Turner, John M. and Dickinson, Bradley W., "A Variable Frame Length Linear Predicitive Coder", "Acoustics, Speech, and Signal Processing, IEEE International Conference on ICASSP '78.", vol. 3, pp. 454-457.
Office Action dated Jun. 6, 2011 for corresponding Japanese Patent Application No. 2007-524151,9 pages.
European Search Report dated Aug. 31, 2007 from corresponding European 06721766.1, 13 pages.
International Preliminary Report on Patentability dated Jan. 3, 2008 from corresponding PCT Application No. PCT/CA2006/000512, 10 pages.
International Search Report and Written Opinion dated Jun. 6, 2006 from corresponding Application No. PCT/CA2006/000512, 16 pages.
Office Action dated Jun. 12, 2010 from corresponding Chinese Application No. 2006-80000746.6, 11 paqes.
Office Action dated Mar. 27, 2008 from corresponding Korean Application No. 10-2007-7002573, 11 pages.
Office Action dated Mar. 31, 2009 from corresponding Korean Application No. 10-2007-7002573, 2 oaoes.
Office Action dated Jan. 7, 2010 from corresponding Japanese Application No. 2007-524151,7 paqes.
Office Action dated Aug. 17, 2010 from corresponding Japanese Application No. 2007-524151, 3 paqes.
Ying et al. "Endpoint Detection of Isolated Utterances Based on a Modified Teager Energy Estimate". In Proc. IEEE ICASSP, vol. 2 pp. 732-735, 1993.

SPEECH END-POINTER

PRIORITY CLAIM

This application is a continuation of prior U.S. patent application Ser. No. 11/152,922, filed Jun. 15, 2005, now U.S. Pat. No. 8,170,875 which is incorporated by reference.

BACKGROUND OF THE INVENTION

1. Technical Field

This invention relates to automatic speech recognition, and more particularly, to a system that isolates spoken utterances from background noise and non-speech transients.

2. Related Art

Within a vehicle environment, Automatic Speech Recognition (ASR) systems may be used to provide passengers with navigational directions based on voice input. This functionality increases safety concerns in that a driver's attention is not distracted away from the road while attempting to manually key in or read information from a screen. Additionally, ASR systems may be used to control audio systems, climate controls, or other vehicle functions. ASR systems enable a user to speak into a microphone and have signals translated into a command that is recognized by a computer. Upon recognition of the command, the computer may implement an application. One factor in implementing an ASR system is correctly recognizing spoken utterances. This requires locating the beginning and/or the end of the utterances ("end-pointing").

Some systems search for energy within an audio frame. Upon detecting the energy, the systems predict the end-points of the utterance by subtracting a predetermined time period from the point at which the energy is detected (to determine the beginning time of the utterance) and adding a predetermined time from the point at which the energy is detected (to determine the end time of the utterance). This selected portion of the audio stream is then passed on to an ASR in an attempt to determine a spoken utterance.

Energy within an acoustic signal may come from many sources. Within a vehicle environment, for example, acoustic signal energy may derive from transient noises such as road bumps, door slams, thumps, cracks, engine noise, movement of air, etc. The system described above, which focuses on the existence of energy, may misinterpret these transient noises to be a spoken utterance and send a surrounding portion of the signal to an ASR system for processing. The ASR system may thus unnecessarily attempt to recognize the transient noise as a speech command, thereby generating false positives and delaying the response to an actual command.

Therefore, a need exists for an intelligent end-pointer system that can identify spoken utterances in transient noise conditions.

SUMMARY

A rule-based end-pointer comprises one or more rules that determine a beginning, an end, or both a beginning and end of an audio speech segment in an audio stream. The rules may be based on various factors, such as the occurrence of an event or combination of events, or the duration of a presence/absence of a speech characteristic. Furthermore, the rules may comprise, analyzing a period of silence, a voiced audio event, a non-voiced audio event, or any combination of such events; the duration of an event; or a duration relative to an event. Depending upon the rule applied or the contents of the audio stream being analyzed, the amount of the audio stream the rule-based end-pointer sends to an ASR may vary.

A dynamic end-pointer may analyze one or more dynamic aspects related to the audio stream, and determine a beginning, an end, or both a beginning and end of an audio speech segment based on the analyzed dynamic aspect. The dynamic aspects that may be analyzed include, without limitation: (1) the audio stream itself, such as the speaker's pace of speech, the speaker's pitch, etc.; (2) an expected response in the audio stream, such as an expected response (e.g., "yes" or "no") to a question posed to the speaker; or (3) the environmental conditions, such as the background noise level, echo, etc. Rules may utilize the one or more dynamic aspects in order to end-point the audio speech segment.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A rule-based end-pointer may examine one or more characteristics of the audio stream for a triggering characteristic. A triggering characteristic may include voiced or non-voiced sounds. Voiced speech segments (e.g. vowels), generated when the vocal cords vibrate, emit a nearly periodic time-domain signal. Non-voiced speech sounds, generated when the vocal cords do not vibrate (such as when speaking the letter "f" in English), lack periodicity and have a time-domain signal that resembles a noise-like structure. By identifying a triggering characteristic in an audio stream and employing a set of rules that operate on the natural characteristics of speech sounds, the end-pointer may improve the determination of the beginning and/or end of a speech utterance.

Alternatively, an end-pointer may analyze at least one dynamic aspect of an audio stream. Dynamic aspects of the audio stream that may be analyzed include, without limitation: (1) the audio stream itself, such as the speaker's pace of speech, the speaker's pitch, etc.; (2) an expected response in an audio stream, such as an expected response (e.g., "yes" or "no") to a question posed to the speaker; or (3) the environmental conditions, such as the background noise level, echo, etc. The dynamic end-pointer may be rule-based. The dynamic nature of the end-pointer enables improved determination of the beginning and/or end of a speech segment.

Figure 1:
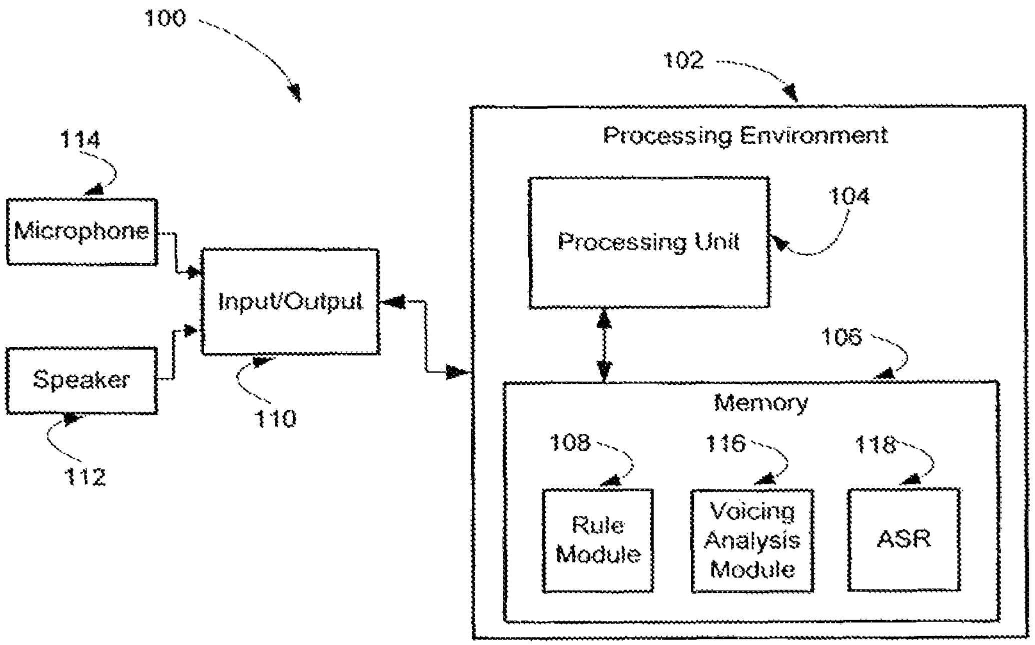
FIG. 1 is a block diagram of a speech end-pointing system.

FIG. 1 is a block diagram of an apparatus 100 for carrying out speech end-pointing based on voice. The end-pointing apparatus 100 may encompass hardware or software that is capable of running on one or more processors in conjunction with one or more operating systems. The end-pointing apparatus 100 may include a processing environment 102, such as a computer. The processing environment 102 may include a processing unit 104 and a memory 106. The processing unit 104 may perform arithmetic, logic and/or control operations by accessing system memory 106 via a bidirectional bus. The memory 106 may store an input audio stream. Memory 106 may include rule module 108 used to detect the beginning and/or end of an audio speech segment. Memory 106 may also include voicing analysis module 116 used to detect a triggering characteristic in an audio segment and/or an ASR unit 118 which may be used to recognize audio input. Additionally, the memory unit 106 may store buffered audio data obtained during the end-pointer's operation. Processing unit 104 communicates with an input/output (I/O) unit 110. I/O unit 110 receives input audio streams from devices that convert sound waves into electrical signals 114 and sends output signals to devices that convert electrical signals to audio sound 112. I/O unit 110 may act as an interface between processing unit 104, and the devices that convert electrical signals to audio sound 112 and the devices that convert sound waves into electrical signals 114. I/O unit 110 may convert input audio streams, received through devices that convert sound waves into electrical signals 114, from an acoustic waveform into a computer understandable format. Similarly, I/O unit 110 may convert signals sent from processing environment 102 to electrical signals for output through devices that convert electrical signals to audio sound 112. Processing unit 104 may be suitably programmed to execute the flowcharts of FIGS. 3 and 4.

Figure 2:
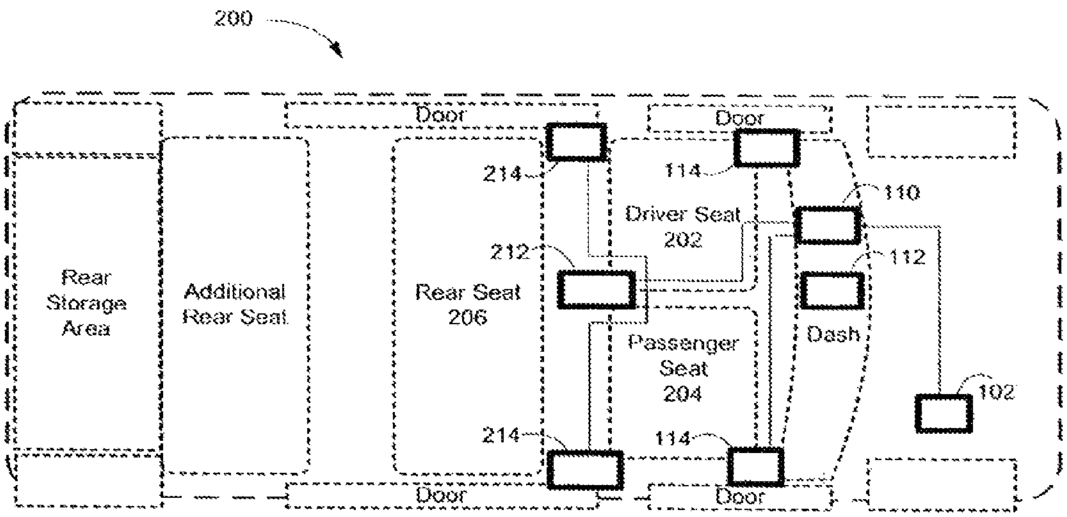
FIG. 2 is a partial illustration of a speech end-pointing system incorporated into a vehicle.

FIG. 2 illustrates an end-pointer apparatus 100 incorporated into a vehicle 200. Vehicle 200 may include a driver's seat 202, a passenger seat 204 and a rear seat 206. Additionally, vehicle 200 may include end-pointer apparatus 100. Processing environment 102 may be incorporated into the vehicle's 200 on-board computer, such as an electronic control unit, an electronic control module, a body control module, or it may be a separate after-factory unit that may communicate with the existing circuitry of vehicle 200 using one or more allowable protocols. Some of the protocols may include J1850VPW, J1850PWM, ISO, ISO9141-2, ISO14230, CAN, High Speed CAN, MOST, LIN, IDB-1394, IDB-C, D2B, Bluetooth, TTCAN, TTP, or the protocol marketed under the trademark FlexRay. One or more devices that convert electrical signals to audio sound 112 may be located in the passenger cavity of vehicle 200, such as in the front passenger cavity. While not limited to this configuration, devices that convert sound waves into electrical signals 114 may be connected to I/O unit 110 for receiving input audio streams. Alternatively, or in addition, an additional device that converts electrical signals to audio sound 212 and devices that convert sound waves into electrical signals 214 may be located in the rear passenger cavity of vehicle 200 for receiving audio streams from passengers in the rear seats and outputting information to these same passengers.

Figure 3:
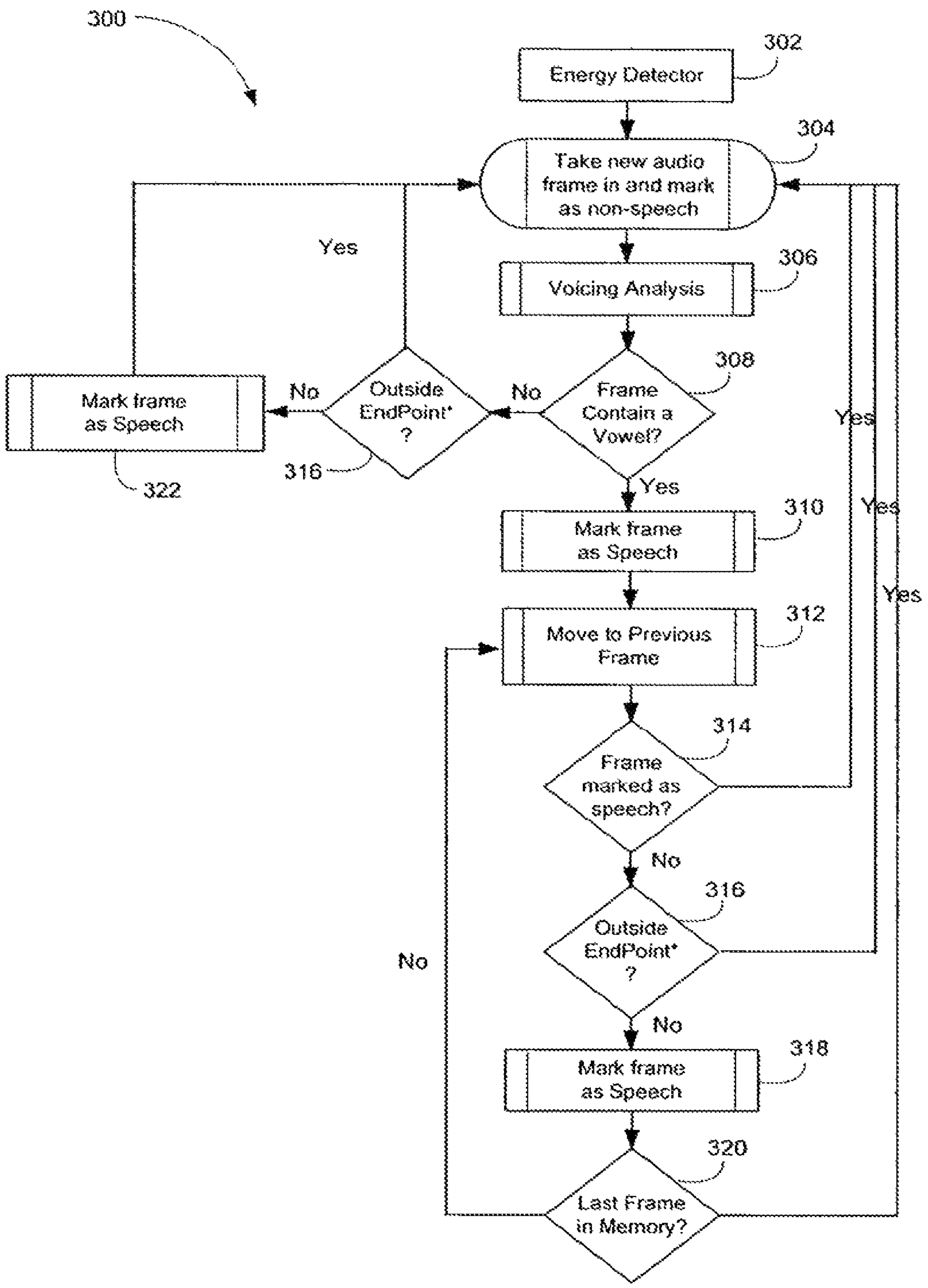
FIG. 3 is a flowchart of a speech end-pointer.

FIG. 3 is a flowchart of a speech end-pointer system. The system may operate by dividing an input audio stream into discrete sections, such as frames, so that the input audio stream may be analyzed on a frame-by-frame basis. Each frame may comprise anywhere from about 10 ms to about 100 ms of the entire input audio stream. The system may buffer a predetermined amount of data, such as about 350 ms to about 500 ms of input audio data, before it begins processing the data. An energy detector, as shown at block 302, may be used to determine if energy, apart from noise, is present. The energy detector examines a portion of the audio stream, such as a frame, for the amount of energy present, and compares the amount to an estimate of the noise energy. The estimate of the noise energy may be constant or may be dynamically determined. The difference in decibels (dB), or ratio in power, may be the instantaneous signal to noise ratio (SNR). Prior to analysis, frames may be assumed to be non-speech so that, if the energy detector determines that energy exists in the frame, the frame is marked as non-speech, as shown at block 304. After energy is detected, voicing analysis of the current frame, designated as frame$_n$ may occur, as shown at block 306. Voicing analysis may occur as described in U.S. Ser. No. 11/131,150, filed May 17, 2005, whose specification is incorporated herein by reference. The voicing analysis may check for any triggering characteristic that may be present in frame$_n$. The voicing analysis may check to see if an audio "S" or "X" is present in frame$_n$. Alternatively, the voicing analysis may check for the presence of a vowel. For purposes of explanation and not for limitation, the remainder of FIG. 3 is described as using a vowel as the triggering characteristic of the voicing analysis.

There are a variety of ways in which the voicing analysis may identify the presence of a vowel in the frame. One manner is through the use of a pitch estimator. The pitch estimator may search for a periodic signal in the frame, indicating that a vowel may be present. Or, pitch estimator may search the frame for a predetermined level of a specific frequency, which may indicate the presence of a vowel.

When the voicing analysis determines that a vowel is present in frame$_n$, frame$_n$ is marked as speech, as shown at block 310. The system then may examine one or more previous frames. The system may examine the immediate preceding frame, frame$_{n-1}$, as shown at block 312. The system may determine whether the previous frame was previously marked as containing speech, as shown at block 314. If the previous frame was already marked as speech (i.e., answer of "Yes" to block 314), the system has already determined that speech is included in the frame, and moves to analyze a new audio frame, as shown at block 304. If the previous frame was not marked as speech (i.e., answer of "No" to block 314), the system may use one or more rules to determine whether the frame should be marked as speech.

As shown in FIG. 3, block 316, designated as decision block "Outside EndPoint" may use a routine that uses one or more rules to determine whether the frame should be marked as speech. One or more rules may be applied to any part of the audio stream, such as a frame or a group of frames. The rules may determine whether the current frame or frames under examination contain speech. The rules may indicate if speech is or is not present in a frame or group of frames. If speech is present, the frame may be designated as being inside the end-point.

If the rules indicate that the speech is not present, the frame may be designated as being outside the end-point. If decision block 316 indicates that frame$_{n-1}$ is outside of the end-point (e.g., no speech is present), then a new audio frame, frame$_{n+1}$, is input into the system and marked as non-speech, as shown at block 304. If decision block 316 indicates that $frame_{n-1}$ is within the end-point (e.g., speech is present), then $frame_{n-1}$ is marked as speech, as shown in block 318. The previous audio stream may be analyzed, frame by frame, until the last frame in memory is analyzed, as shown at block 320.

Figure 4:
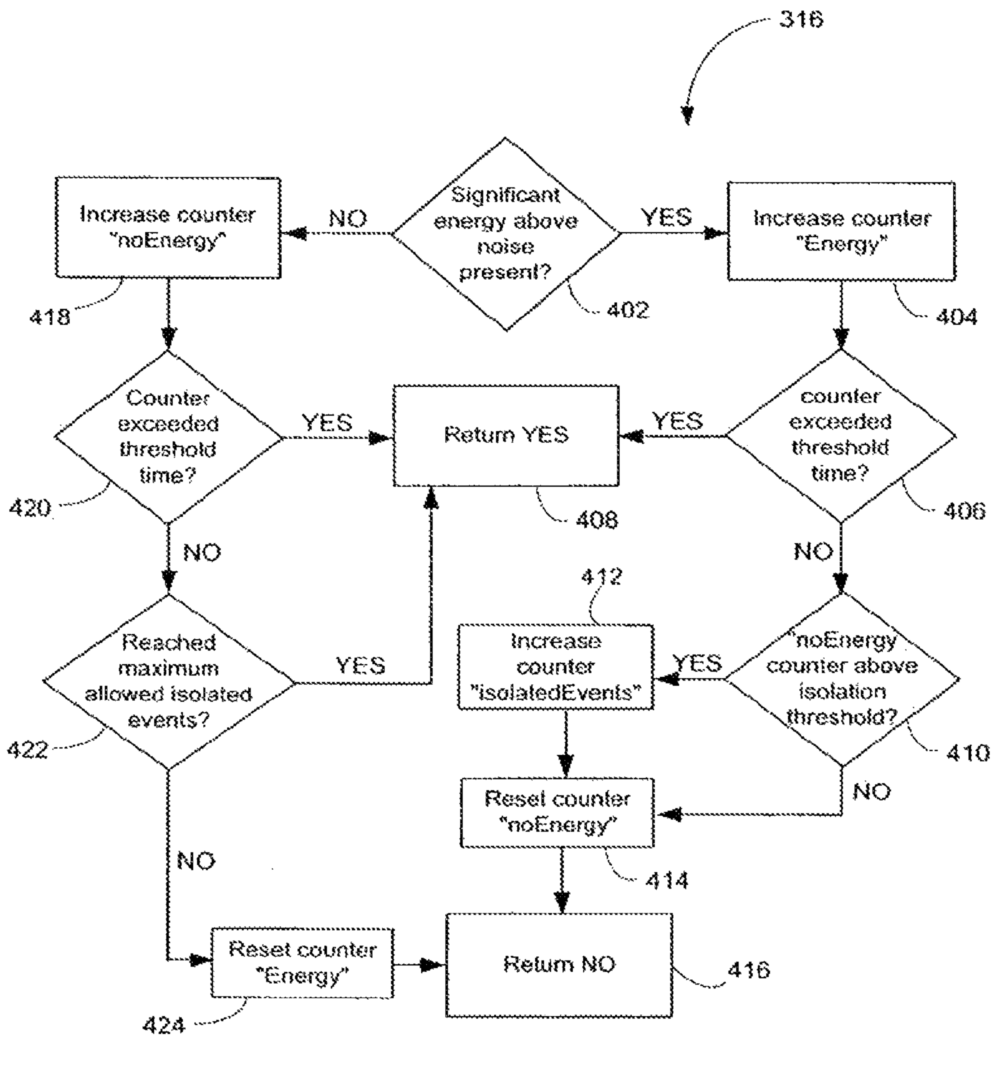
FIG. 4 is a more detailed flowchart of a portion of FIG. 3.

FIG. 4 is a more detailed flowchart for block 316 depicted in FIG. 3. As discussed above, block 316 may include one or more rules. The rules may relate to any aspect regarding the presence and/or absence of speech. In this manner, the rules may be used to determine a beginning and/or an end of a spoken utterance.

The rules may be based on analyzing an event (e.g. voiced energy, non-voiced energy, an absence/presence of silence, etc.) or any combination of events (e.g. non-voiced energy followed by silence followed by voiced energy, voiced energy followed by silence followed by non-voiced energy, silence followed by non-voiced energy followed by silence, etc.). Specifically, the rules may examine transitions into energy events from periods of silence or from periods of silence into energy events. A rule may analyze the number of transitions before a vowel with a rule that speech may include no more than one transition from a non-voiced event or silence before a vowel. Or a rule may analyze the number of transitions after a vowel with a rule that speech may include no more than two transitions from a non-voiced event or silence after a vowel.

One or more rules may examine various duration periods. Specifically, the rules may examine a duration relative to an event (e.g. voiced energy, non-voiced energy, an absence/presence of silence, etc.). A rule may analyze the time duration before a vowel with a rule that speech may include a time duration before a vowel in the range of about 300 ms to 400 ms, and may be about 350 ms. Or a rule may analyze the time duration after a vowel with a rule that speech may include a time duration after a vowel in the range of about 400 ms to about 800 ms, and may be about 600 ms.

One or more rules may examine the duration of an event. Specifically, the rules may examine the duration of a certain type of energy or the lack of energy. Non-voiced energy is one type of energy that may be analyzed. A rule may analyze the duration of continuous non-voiced energy with a rule that speech may include a duration of continuous non-voiced energy in the range of about 150 ms to about 300 ms, and may be about 200 ms. Alternatively, continuous silence may be analyzed as a lack of energy. A rule may analyze the duration of continuous silence before a vowel with a rule that speech may include a duration of continuous silence before a vowel in the range of about 50 ms to about 80 ms, and may be about 70 ms. Or a rule may analyze the time duration of continuous silence after a vowel with a rule that speech may include a duration of continuous silence after a vowel in the range of about 200 ms to about 300 ms, and may be about 250 ms.

At block 402, a check is performed to determine if a frame or group of frames being analyzed has energy above the background noise level. A frame or group of frames having energy above the background noise level may be further analyzed based on the duration of a certain type of energy or a duration relative to an event. If the frame or group of frames being analyzed does not have energy above the background noise level, then the frame or group of frames may be further analyzed based on a duration of continuous silence, a transition into energy events from periods of silence, or a transition from periods of silence into energy events.

If energy is present in the frame or a group of frames being analyzed, an "Energy" counter is incremented at block 404. "Energy" counter counts an amount of time. It is incremented by the frame length. If the frame size is about 32 ms, then block 404 increments the "Energy" counter by about 32 ms. At decision 406, a check is performed to see if the value of the "Energy" counter exceeds a time threshold. The threshold evaluated at decision block 406 corresponds to the continuous non-voiced energy rule which may be used to determine the presence and/or absence of speech. At decision block 406, the threshold for the maximum duration of continuous non-voiced energy may be evaluated. If decision 406 determines that the threshold setting is exceeded by the value of the "Energy" counter, then the frame or group of frames being analyzed are designated as being outside the end-point (e.g. no speech is present) at block 408. As a result, referring back to FIG. 3, the system jumps back to block 304 where a new frame, $frame_{n+1}$, is input into the system and marked as non-speech. Alternatively, multiple thresholds may be evaluated at block 406.

If no time threshold is exceeded by the value of the "Energy" counter at block 406, then a check is performed at decision block 410 to determine if the "noEnergy" counter exceeds an isolation threshold. Similar to the "Energy" counter 404, "noEnergy" counter 418 counts time and is incremented by the frame length when a frame or group of frames being analyzed does not possess energy above the noise level. The isolation threshold is a time threshold defining an amount of time between two plosive events. A plosive is a consonant that literally explodes from the speaker's mouth. Air is momentarily blocked to build up pressure to release the plosive. Plosives may include the sounds "P", "T", "B", "D", and "K". This threshold may be in the range of about 10 ms to about 50 ms, and may be about 25 ms. If the isolation threshold is exceeded an isolated non-voiced energy event, a plosive surrounded by silence (e.g. the P in STOP) has been identified, and "isolatedEvents" counter 412 is incremented. The "isolatedEvents" counter 412 is incremented in integer values. After incrementing the "isolatedEvents" counter 412 "noEnergy" counter 418 is reset at block 414. This counter is reset because energy was found within the frame or group of frames being analyzed. If the "noEnergy" counter 418 does not exceed the isolation threshold, then "noEnergy" counter 418 is reset at block 414 without incrementing the "isolatedEvents" counter 412. Again, "noEnergy" counter 418 is reset because energy was found within the frame or group of frames being analyzed. After resetting "noEnergy" counter 418, the outside end-point analysis designates the frame or frames being analyzed as being inside the end-point (e.g. speech is present) by returning a "NO" value at block 416. As a result, referring back to FIG. 3, the system marks the analyzed frame as speech at 318 or 322.

Alternatively, if decision 402 determines there is no energy above the noise level then the frame or group of frames being analyzed contain silence or background noise. In this case, "noEnergy" counter 418 is incremented. At decision 420, a check is performed to see if the value of the "noEnergy" counter exceeds a time threshold. The threshold evaluated at decision block 420 corresponds to the continuous non-voiced energy rule threshold which may be used to determine the presence and/or absence of speech. At decision block 420, the threshold for a duration of continuous silence may be evaluated. If decision 420 determines that the threshold setting is exceeded by the value of the "noEnergy" counter, then the frame or group of frames being analyzed are designated as being outside the end-point (e.g. no speech is present) at block 408. As a result, referring back to FIG. 3, the system jumps back to block 304 where a new frame, $frame_{n+1}$, is input into the system and marked as non-speech. Alternatively, multiple thresholds may be evaluated at block 420.

If no time threshold is exceed by the value of the "noEnergy" counter 418, then a check is performed at decision block 422 to determine if the maximum number of allowed isolated events has occurred. An "isolatedEvents" counter provides the necessary information to answer this check. The maximum number of allowed isolated events is a configurable parameter. If a grammar is expected (e.g. a "Yes" or a "No" answer) the maximum number of allowed isolated events may be set accordingly so as to "tighten" the end-pointer's results. If the maximum number of allowed isolated events has been exceeded, then the frame or frames being analyzed are designated as being outside the end-point (e.g. no speech is present) at block 408. As a result, referring back to FIG. 3, the system jumps back to block 304 where a new frame, $frame_{n+1}$, is input into the system and marked as non-speech.

If the maximum number of allowed isolated events has not been reached, "Energy" counter 404 is reset at block 424. "Energy" counter 404 may be reset when a frame of no energy is identified. After resetting "Energy" counter 404, the outside end-point analysis designates the frame or frames being analyzed as being inside the end-point (e.g. speech is present) by returning a "NO" value at block 416. As a result, referring back to FIG. 3, the system marks the analyzed frame as speech at 318 or 322.

Figure 5:
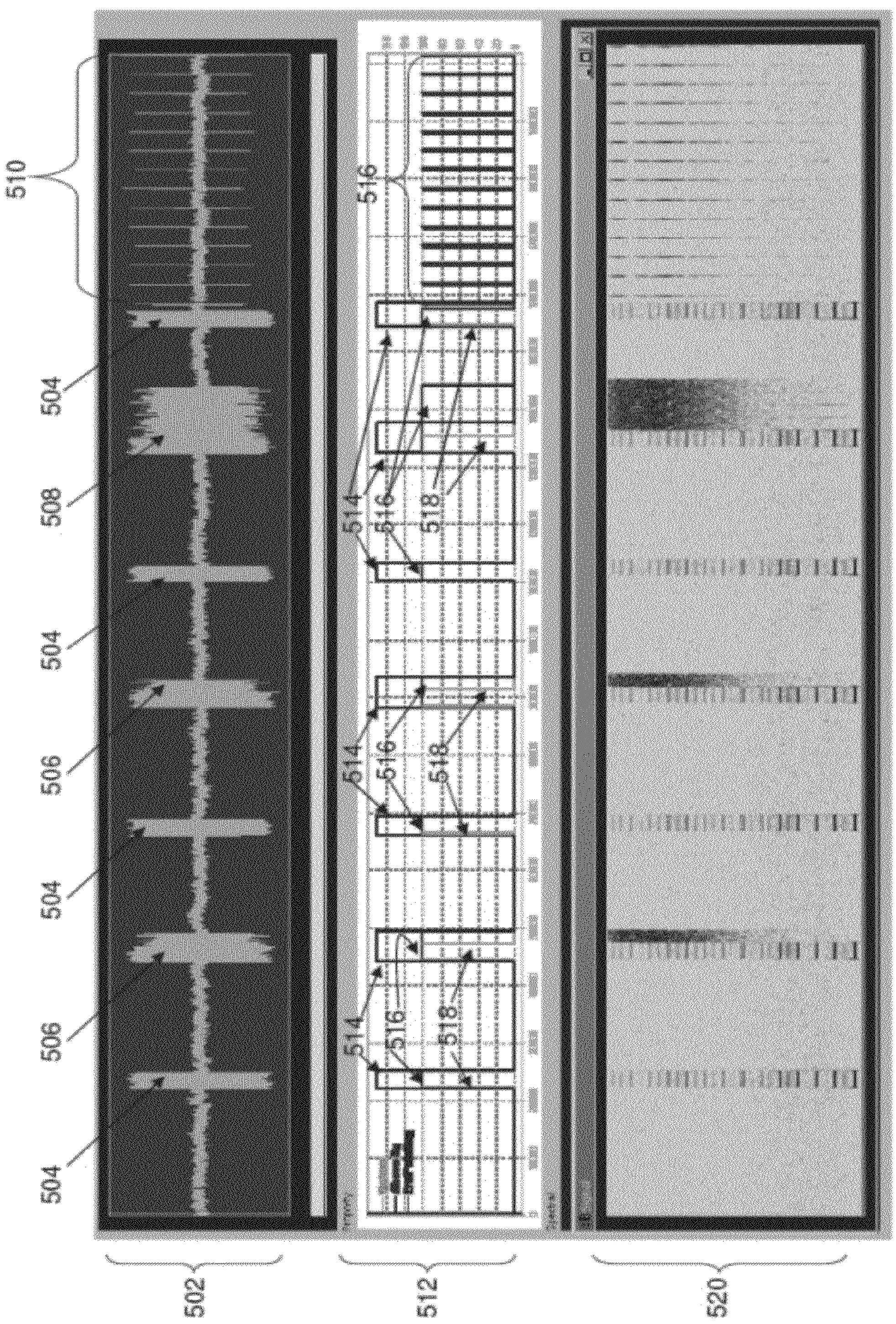
FIG. 5 is an end-pointing of simulated speech sounds.

FIGS. 5-9 show some raw time series of a simulated audio stream, various characterization plots of these signals, and spectrographs of the corresponding raw signals. In FIG. 5, block 502, illustrates the raw time series of a simulated audio stream. The simulated audio stream comprises the spoken utterances "NO" 504, "YES" 506, "NO" 504, "YES" 506, "NO" 504, "YESSSSS" 508, "NO" 504, and a number of "clicking" sounds 510. These clicking sounds may represent the sound generated when a vehicle's turn signal is engaged. Block 512 illustrates various characterization plots for the raw time series audio stream. Block 512 displays the number of samples along the x-axis. Plot 514 is one representation of the end-pointer's analysis. When plot 514 is at a zero level, the end-pointer has not determined the presence of a spoken utterance. When plot 514 is at a non-zero level the end-pointer bounds the beginning and/or end of a spoken utterance. Plot 516 represents energy above the background energy level. Plot 518 represents a spoken utterance in the time-domain. Block 520 illustrates a spectral representation of the corresponding audio stream identified in block 502.

Block 512 illustrates how the end-pointer may respond to an input audio stream. As shown in FIG. 5, end-pointer plot 514 correctly captures the "NO" 504 and the "YES" 506 signals. When the "YESSSSS" 508 is analyzed, the end-pointer plot 514 captures the trailing "S" for a while, but when it finds that the maximum time period after a vowel or the maximum duration of continuous non-voiced energy has been exceeded the end-pointer cuts off. The rule-based end-pointer sends the portion of the audio stream that is bound by end-pointer plot 514 to an ASR. As illustrated in block 512, and FIGS. 6-9, the portion of the audio stream sent to an ASR varies depending upon which rule is applied. The "clicks" 510 were detected as having energy. This is represented by the above background energy plot 516 at the right most portion of block 512. However, because no vowel was detected in the "clicks" 510, the end-pointer excludes these audio sounds.

Figure 6:
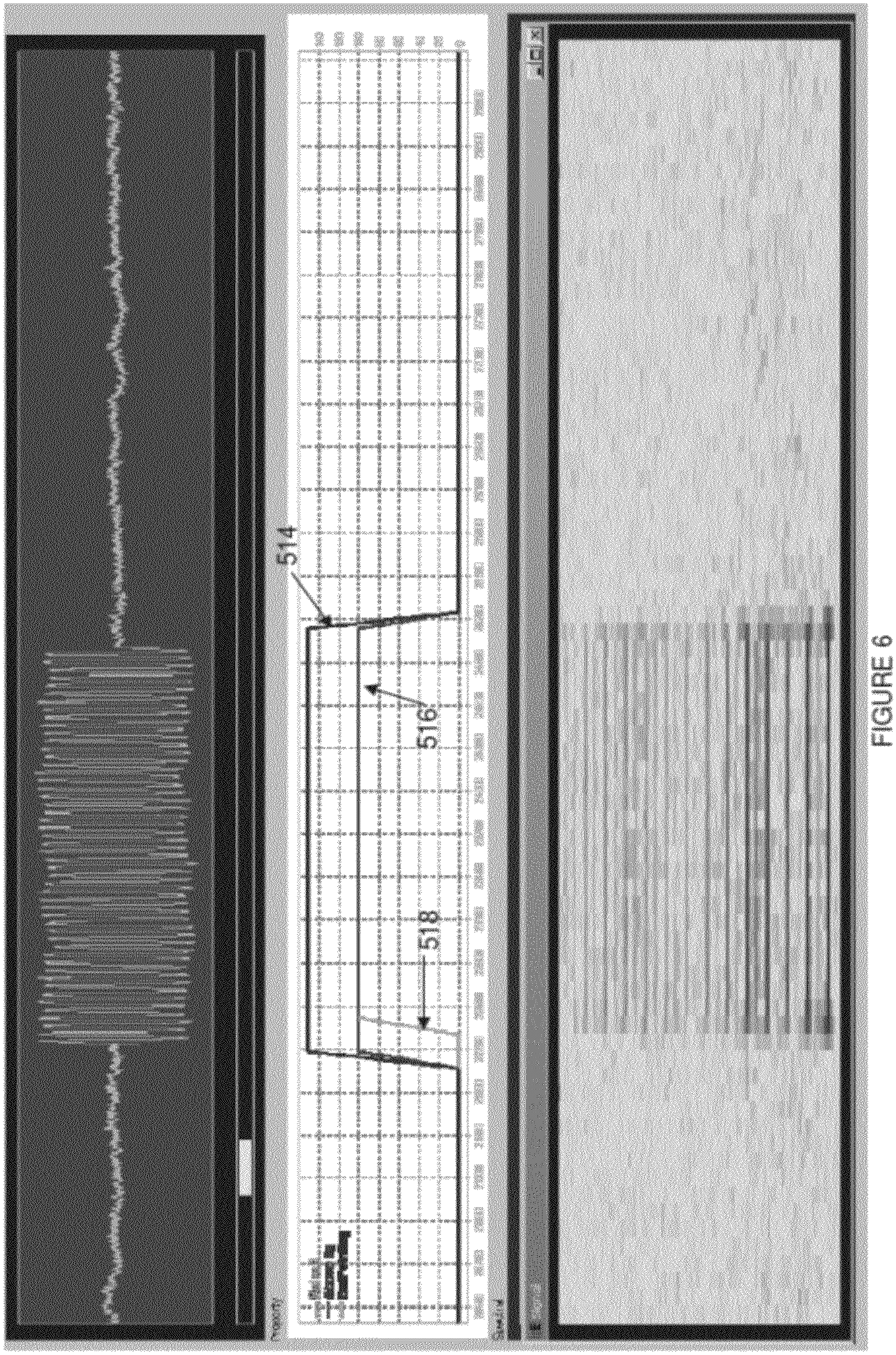
FIG. 6 is a detailed end-pointing of some of the simulated speech sounds of FIG. 5.

FIG. 6 is a close up of one end-pointed "NO" 504. Spoken utterance plot 518 lags by a frame or two due to time smearing. Plot 518 continues throughout the period in which energy is detected, which is represented by above energy plot 516. After spoken utterance plot 518 rises, it levels off and follows above background energy plot 516. End-pointer plot 514 begins when the speech energy is detected. During the period represented by plot 518 none of the end-pointer rules are violated and the audio stream is recognized as a spoken utterance. The end-pointer cuts off at the right most side when either the maximum duration of continuous silence after a vowel rule or the maximum time after a vowel rule may have been violated. As illustrated, the portion of the audio stream that is sent to an ASR comprises approximately 3150 samples.

Figure 7:
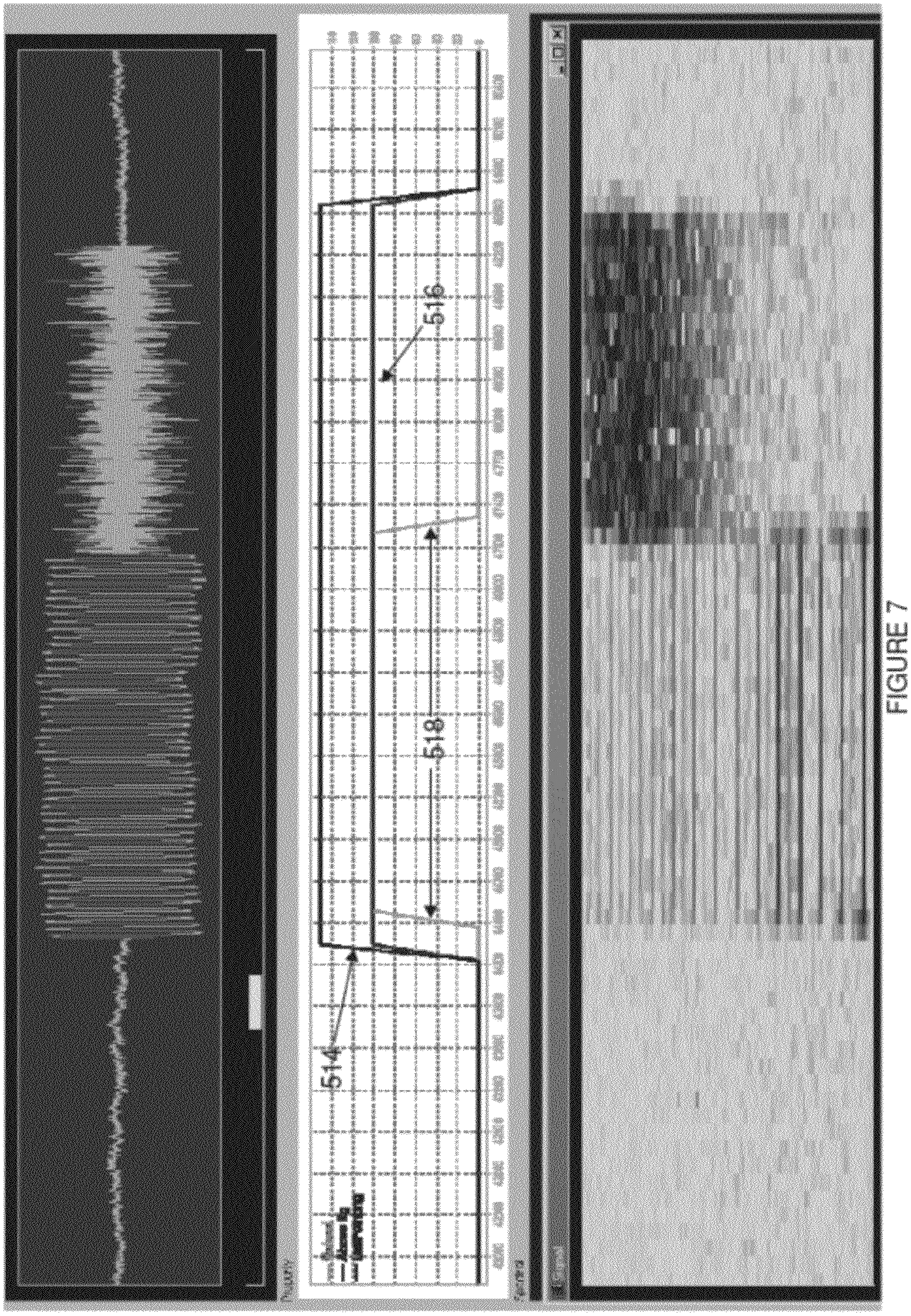
FIG. 7 is a second detailed end-pointing of some of the simulated speech sounds of FIG. 5.

FIG. 7 is a close up of one end-pointed "YES" 506. Spoken utterance plot 518 again lags by a frame or two due to time smearing. End-pointer plot 514 begins when the energy is detected. End-pointer plot 514 continues until the energy falls off to noise; when the maximum duration of continuous non-voiced energy rule or the maximum time after a vowel rule may have been violated. As illustrated, the portion of the audio stream that is sent to an ASR comprises approximately 5550 samples. The difference between the amounts of the audio stream sent to an ASR in FIG. 6 and FIG. 7 results from the end-pointer applying different rules.

Figure 8:
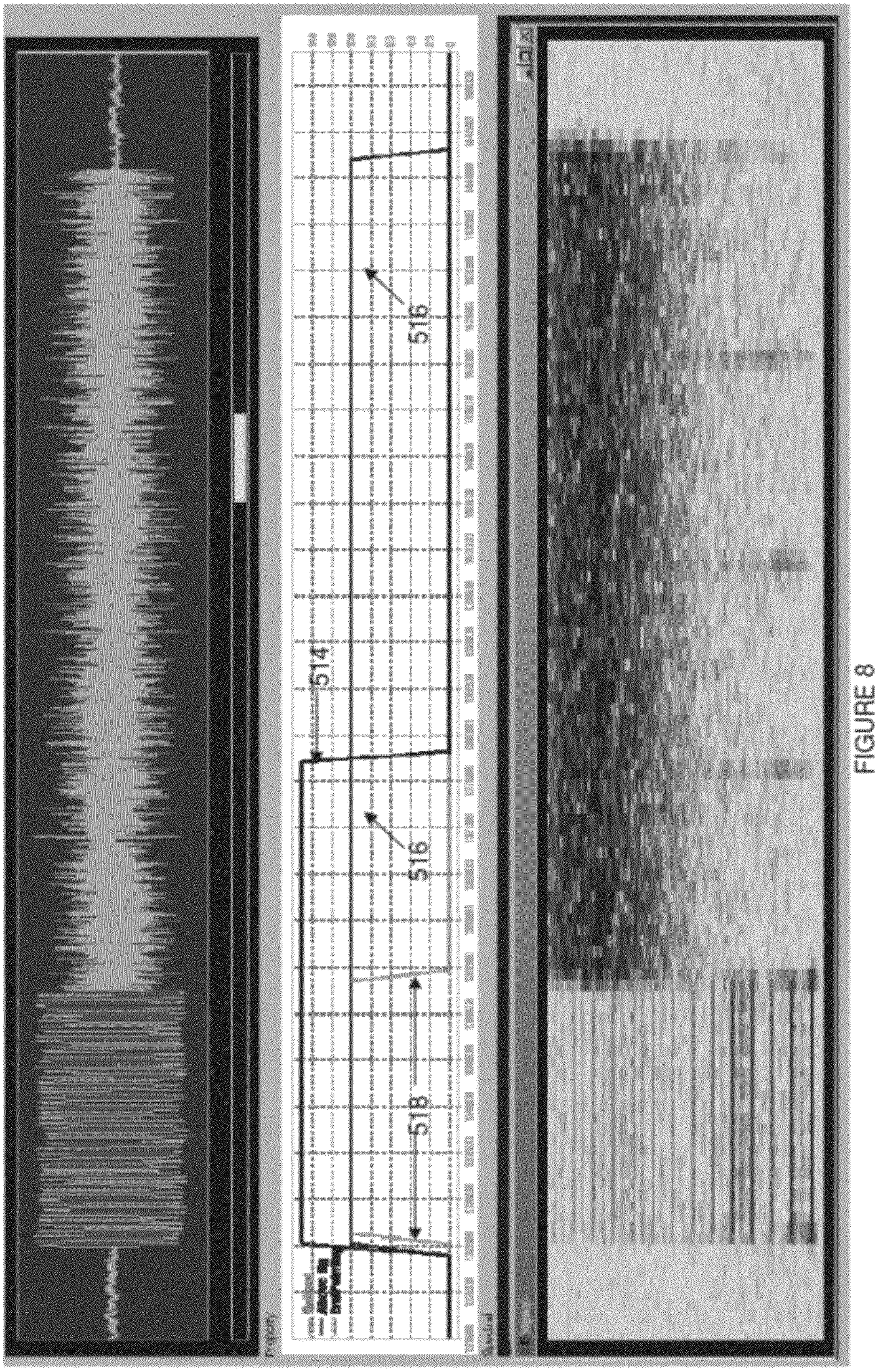
FIG. 8 is a third detailed end-pointing of some of the simulated speech sounds of FIG. 5.

FIG. 8 is a close up of one end-pointed "YESSSSS" 508. The end-pointer accepts the post-vowel energy as a possible consonant, but only for a reasonable amount of time. After a reasonable time period, the maximum duration of continuous non-voiced energy rule or the maximum time after a vowel rule may have been violated and the end-pointer falls off limiting the data passed to an ASR. As illustrated, the portion of the audio stream that is sent to an ASR comprises approximately 5750 samples. Although the spoken utterance continues on for an additional approximately 6500 samples, because the end-pointer cuts off the after a reasonable amount of time the amount of the audio stream sent to an ASR differs from that sent in FIG. 6 and FIG. 7.

Figure 9:
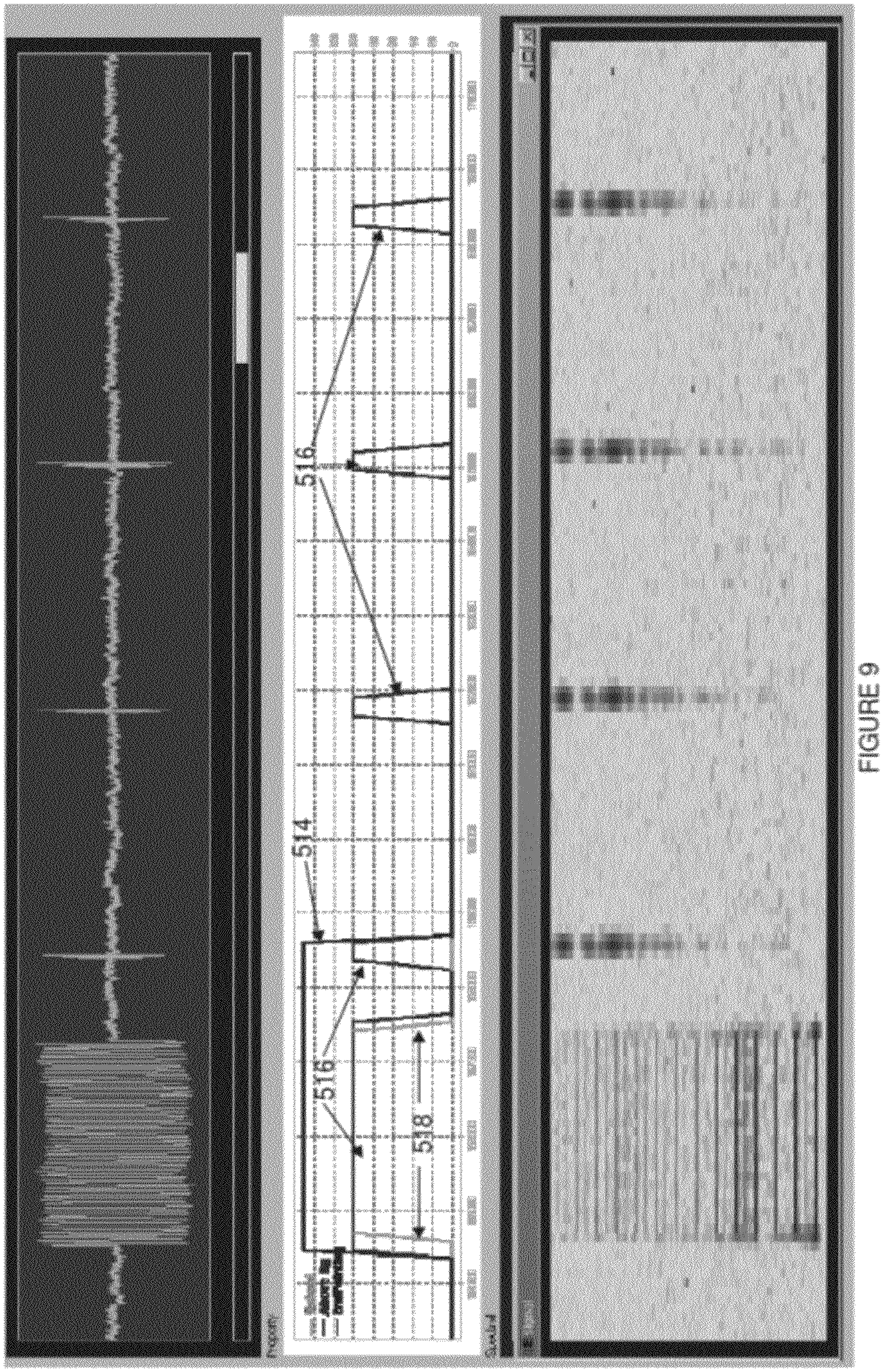
FIG. 9 is a fourth detailed end-pointing of some of the simulated speech sounds of FIG. 5.

FIG. 9 is a close up of an end-pointed "NO" 504 followed by several "clicks" 510. As with FIGS. 6-8, spoken utterance plot 518 lags by a frame or two because of time smearing. End-pointer plot 514 begins when the energy is detected. The IQ first click is included within end-point plot 514 because there is energy above the background noise energy level and this energy could be a consonant, i.e. a trailing "T". However, there is about 300 ms of silence between the first click and the next click. This period of silence, according the threshold values used for this example, violates the end-pointer's maximum duration of continuous silence after a vowel rule. Therefore, the end-pointer excluded the energies after the first click.

Figure 10:
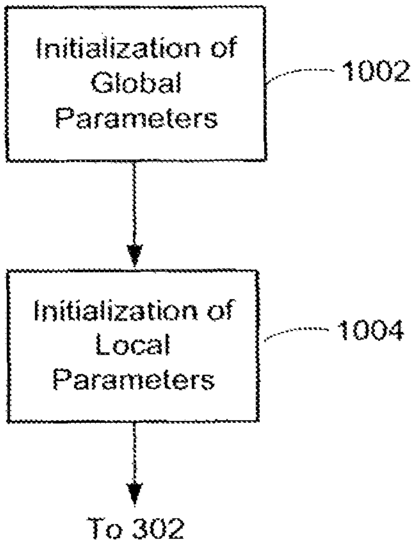
FIG. 10 is a partial flowchart of a dynamic speech end-pointing system based on voice.

The end-pointer may also be configured to determine the beginning and/or end of an audio speech segment by analyzing at least one dynamic aspect of an audio stream. FIG. 10 is a partial flowchart of an end-pointer system that analyzes at least one dynamic aspect of an audio stream. An initialization of global aspects may be performed at 1002. Global aspects may include characteristics of the audio stream itself. For purposes of explanation and not for limitation, these global aspects may include a speaker's pace of speech or a speaker's pitch. At 1004, an initialization of local aspects may be performed. For purposes of explanation and not for limitation, these local aspects may include an expected speaker response (e.g. a "YES" or a "NO" answer), environmental conditions (e.g. an open or closed environment, effecting the presence of echo or feedback in the system), or estimation of the background noise.

The global and local initializations may occur at various times throughout the system's operation. The estimation of the background noise (local aspect initialization) may be performed every time the system is first powered up and/or after a predetermined time period. The determination of a speaker's pace of speech or pitch (global initialization) may be analyzed and initialized at a less often rate. Similarly, the local aspect that a certain response is expected may be initialized at a less often rate. This initialization may occur when the ASR communicates to the end-pointer that a certain response is expected. The local aspect for the environment condition may be configured to initialize only once per power cycle.

During initialization periods 1002 and 1004, the end-pointer may operate at its default threshold settings as previously described with regard to FIGS. 3 and 4. If any of the initializations require a change to a threshold setting or timer, the system may dynamically alter the appropriate threshold values. Alternatively, based upon the initialization values, the system may recall a specific or general user profile previously stored within the system's memory. This profile may alter all or certain threshold settings and timers. If during the initialization process the system determines that a user speaks at a fast pace, the maximum duration of certain rules may be reduced to a level stored within the profile. Furthermore, it may be possible to operate the system in a training mode such that the system implements the initializations in order to create and store a user profile for later use. One or more profiles may be stored within the system's memory for later use.

A dynamic end-pointer may be configured similar to the end-pointer described in FIG. 1. Additionally, a dynamic end-pointer may include a bidirectional bus between the processing environment and an ASR. The bidirectional bus may transmit data and control information between the processing environment and an ASR. Information passed from an ASR to the processing environment may include data indicating that a certain response is expected in response to a question posed to a speaker. Information passed from an ASR to the processing environment may be used to dynamically analyze aspects of an audio stream.

The operation of a dynamic end-pointer may be similar to the end-pointer described with reference to FIGS. 3 and 4, except that one or more thresholds of the one or more rules of the "Outside Endpoint" routine, block 316, may be dynamically configured. If there is a large amount of background noise, the threshold for the energy above noise decision, block 402, may be dynamically raised to account for this condition. Upon performing this re-configuration, the dynamic end-pointer may reject more transient and non-speech sounds thereby reducing the number of false positives. Dynamically configurable thresholds are not limited to the background noise level. Any threshold utilized by the dynamic end-pointer may be dynamically configured.

The methods shown in FIGS. 3, 4, and 10 may be encoded in a signal bearing medium, a computer readable medium such as a memory, programmed within a device such as one or more integrated circuits, or processed by a controller or a computer. If the methods are performed by software, the software may reside in a memory resident to or interfaced to the rule module 108 or any type of communication interface. The memory may include an ordered listing of executable instructions for implementing logical functions. A logical function may be implemented through digital circuitry, through source code, through analog circuitry, or through an analog source such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A speech end-pointer system, comprising:

a computer processor;

a voice triggering module configured to identify a portion of an audio stream comprising a speech segment; and a rule module in communication with the voice triggering module, the rule module comprising a plurality of rules used by the computer processor to analyze the audio stream and detect a beginning and an end of the speech segment, where the plurality of rules comprises one or more rules based on an energy counter;

where the beginning of the speech segment and the end of the speech segment represent boundaries between speech and non-speech portions of the audio stream; and where the computer processor is configured to determine whether a frame of the audio stream has energy above a background noise level and increment the energy counter by a length of the frame in response to a determination that the frame has energy above the background noise level.

2. The system of claim 1, where the plurality of rules includes a rule configured to set the beginning of the speech segment or the end of the speech segment based on a comparison between the energy counter and a threshold.

3. The system of claim 1, where the plurality of rules includes a rule configured to set the beginning of the speech segment or the end of the speech segment based on a comparison between a lack of energy counter and a threshold.

4. The system of claim 1, where the plurality of rules includes a rule configured to set the beginning of the speech segment or the end of the speech segment based on a comparison between an isolated energy event counter and a threshold.

5. The system of claim 1, where the plurality of rules includes a first rule configured to set the beginning of the speech segment or the end of the speech segment based on a comparison between the energy counter and a first threshold, and a second rule configured to set the beginning of the speech segment or the end of the speech segment based on a comparison between a lack of energy counter and a second threshold.

6. The system of claim 1, where the plurality of rules includes a first rule configured to set the beginning of the speech segment or the end of the speech segment based on a comparison between the energy counter and a first threshold, a second rule configured to set the beginning of the speech segment or the end of the speech segment based on a comparison between a lack of energy counter and a second threshold, and a third rule configured to set the beginning of the speech segment or the end of the speech segment based on a comparison between an isolated energy event counter and a third threshold.

7. The system of claim 1, where the plurality of rules comprises one or more rules based on a lack of energy counter;

where the computer processor is configured to increment the lack of energy counter by the length of the frame in response to a determination that the frame does not have energy above the background noise level.

8. The system of claim 7, where the computer processor is configured to execute the rule module and set the beginning of the speech segment or the end of the speech segment in response to a determination that the frame has energy above the background noise level and the energy counter is above a continuous non-voiced energy threshold.

9. The system of claim 7, where the computer processor is configured to execute the rule module and set the beginning of the speech segment or the end of the speech segment in response to a determination that the frame does not have energy above the background noise level and the lack of energy counter is above a continuous silence threshold.

10. The system of claim 1, where the plurality of rules comprises a rule based on an isolated energy event counter;

where the computer processor is configured to execute the rule module and set the beginning of the speech segment or the end of the speech segment in response to a determination that the isolated energy event counter is above a maximum allowed isolated energy event threshold.

11. The system of claim 10, where the computer processor is configured to execute the rule module and increment the isolated energy event counter in response to an identification of a plosive surrounded by silence in the audio stream.

12. A speech end-pointing method, comprising:

receiving an audio stream;

analyzing energy and noise characteristics of a frame of the audio stream by a computer processor to determine whether the frame has energy above a background noise level;

incrementing an energy counter by a length of the frame in response to a determination by the computer processor that the frame has energy above the background noise level;

incrementing a lack of energy counter by the length of the frame in response to a determination by the computer processor that the frame does not have energy above the background noise level; and applying a plurality of rules by the computer processor to detect a beginning and an end of a speech segment of the audio stream based on the energy counter and the lack of energy counter.

13. The method of claim 12, where the beginning of the speech segment and the end of the speech segment represent boundaries between speech and non-speech portions of the audio stream.

14. The method of claim 12, where the plurality of rules includes a rule configured to set the beginning of the speech segment or the end of the speech segment based on a comparison between the energy counter and a first threshold, and where the plurality of rules includes a second rule configured to set the beginning of the speech segment or the end of the speech segment based on a comparison between the lack of energy counter and a second threshold.

15. The method of claim 12, where the step of applying the plurality of rules comprises setting the beginning of the speech segment or the end of the speech segment in response to a determination that the frame has energy above the background noise level and the energy counter is above a continuous non-voiced energy threshold.

16. The method of claim 12, where the step of applying the plurality of rules comprises setting the beginning of the speech segment or the end of the speech segment in response to a determination that the frame does not have energy above the background noise level and the lack of energy counter is above a continuous silence threshold.

17. The method of claim 12, further comprising setting the beginning of the speech segment or the end of the speech segment by the computer processor in response to a determination that an isolated energy event counter is above a maximum allowed isolated energy event threshold.

18. The method of claim 17, further comprising incrementing the isolated energy event counter in response to an identification by the computer processor of a plosive surrounded by silence in the audio stream.

19. The method of claim 12, further comprising:

resetting the lack of energy counter in response to the determination by the computer processor that the frame has energy above the background noise level; and resetting the energy counter in response to the determination by the computer processor that the frame does not have energy above the background noise level.

20. A non-transitory computer-readable medium with instructions stored thereon, where the instructions are executable by a computer processor to cause the computer processor to perform the steps of:

receiving an audio stream;

analyzing energy and noise characteristics of a frame of the audio stream to determine whether the frame has energy above a background noise level;

incrementing an energy counter by a length of the frame in response to a determination that the frame has energy above the background noise level;

incrementing a lack of energy counter by the length of the frame in response to a determination that the frame does not have energy above the background noise level; and applying a plurality of rules to detect a beginning and an end of a speech segment of the audio stream based on the energy counter and the lack of energy counter.

* * * * *